No. 771,747. PATENTED OCT. 4, 1904.
I. ROBBINS.
MACHINE FOR MAKING TAGS.
APPLICATION FILED FEB. 2, 1903.
NO MODEL. 8 SHEETS—SHEET 1.

Witnesses
L. Houville,
O. H. Eagle

Inventor
Ira Robbins.
By Widdersheim & Fairbanks,
Attorneys

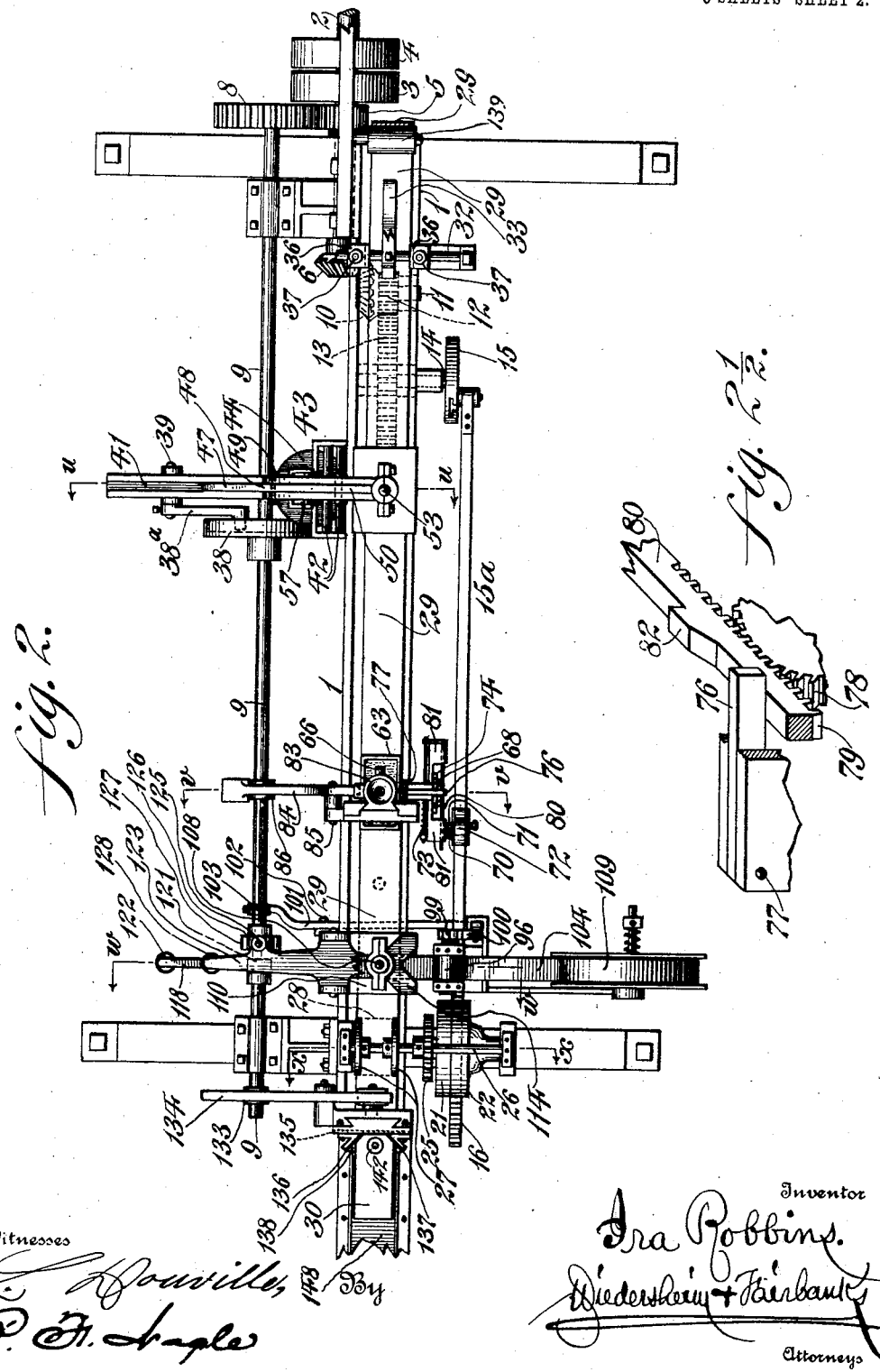

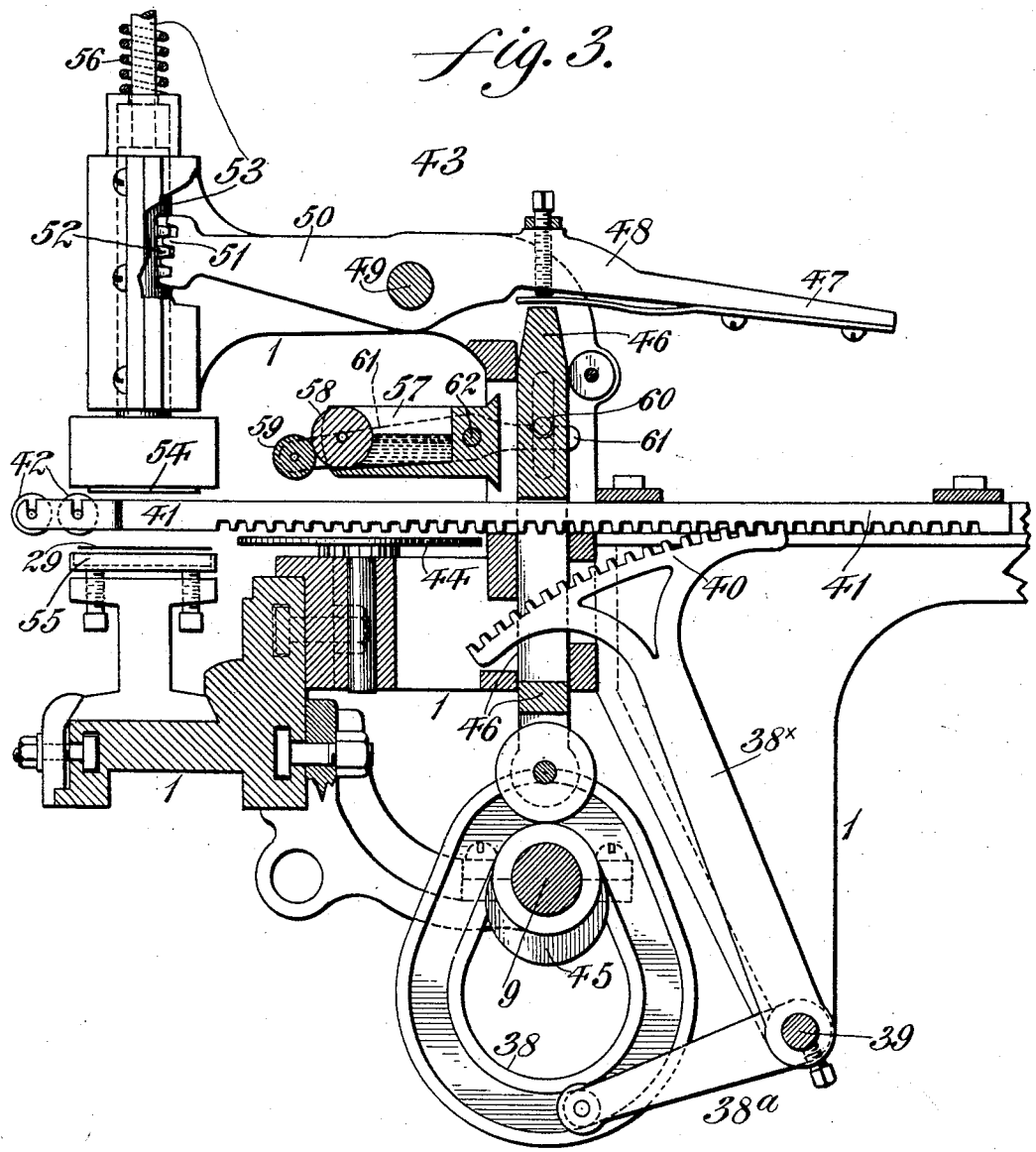

No. 771,747. PATENTED OCT. 4, 1904.
I. ROBBINS.
MACHINE FOR MAKING TAGS.
APPLICATION FILED FEB. 2, 1903.
NO MODEL. 8 SHEETS—SHEET 4.
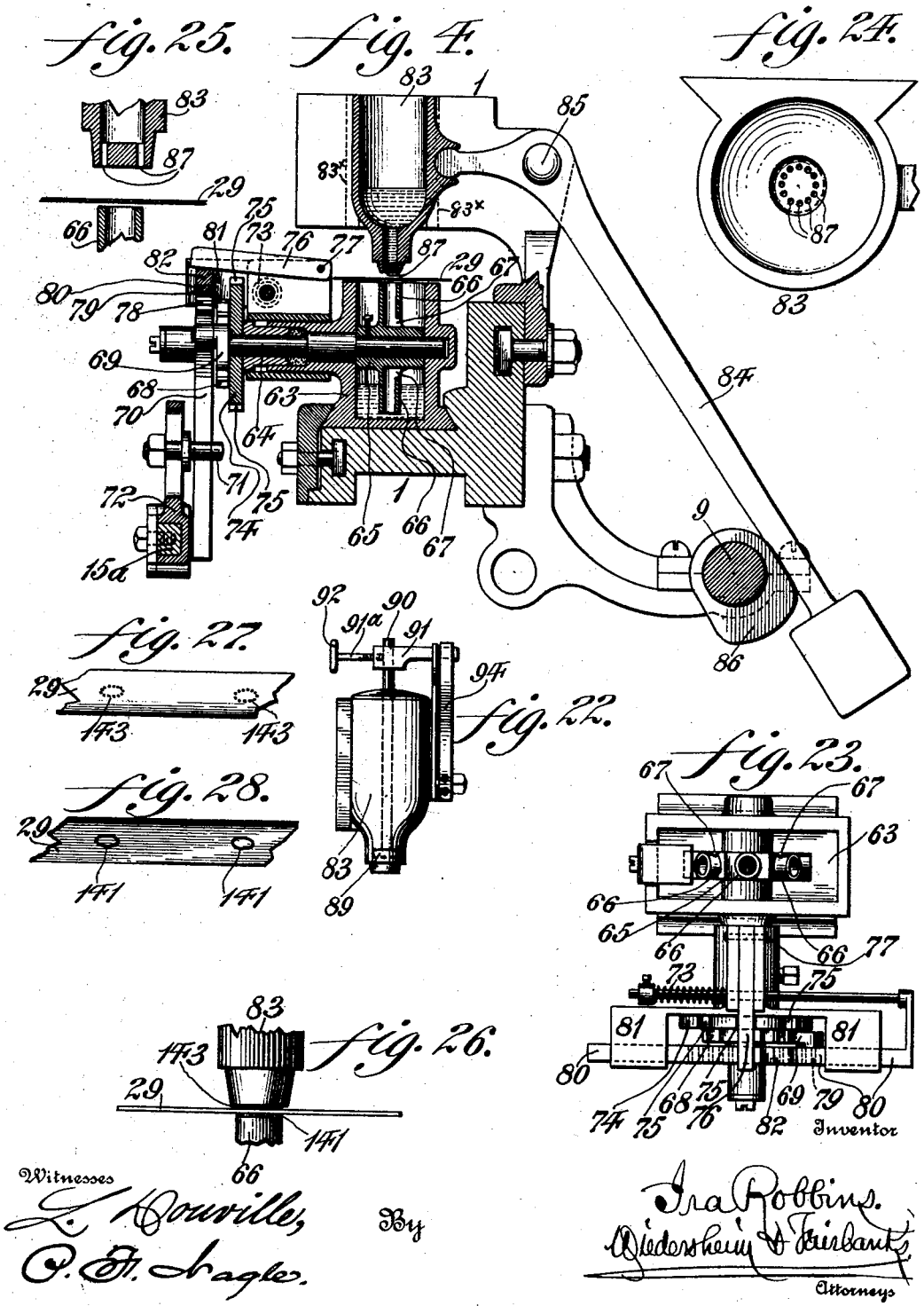

No. 771,747. PATENTED OCT. 4, 1904.
I. ROBBINS.
MACHINE FOR MAKING TAGS.
APPLICATION FILED FEB. 2, 1903.
NO MODEL. 8 SHEETS—SHEET 5.
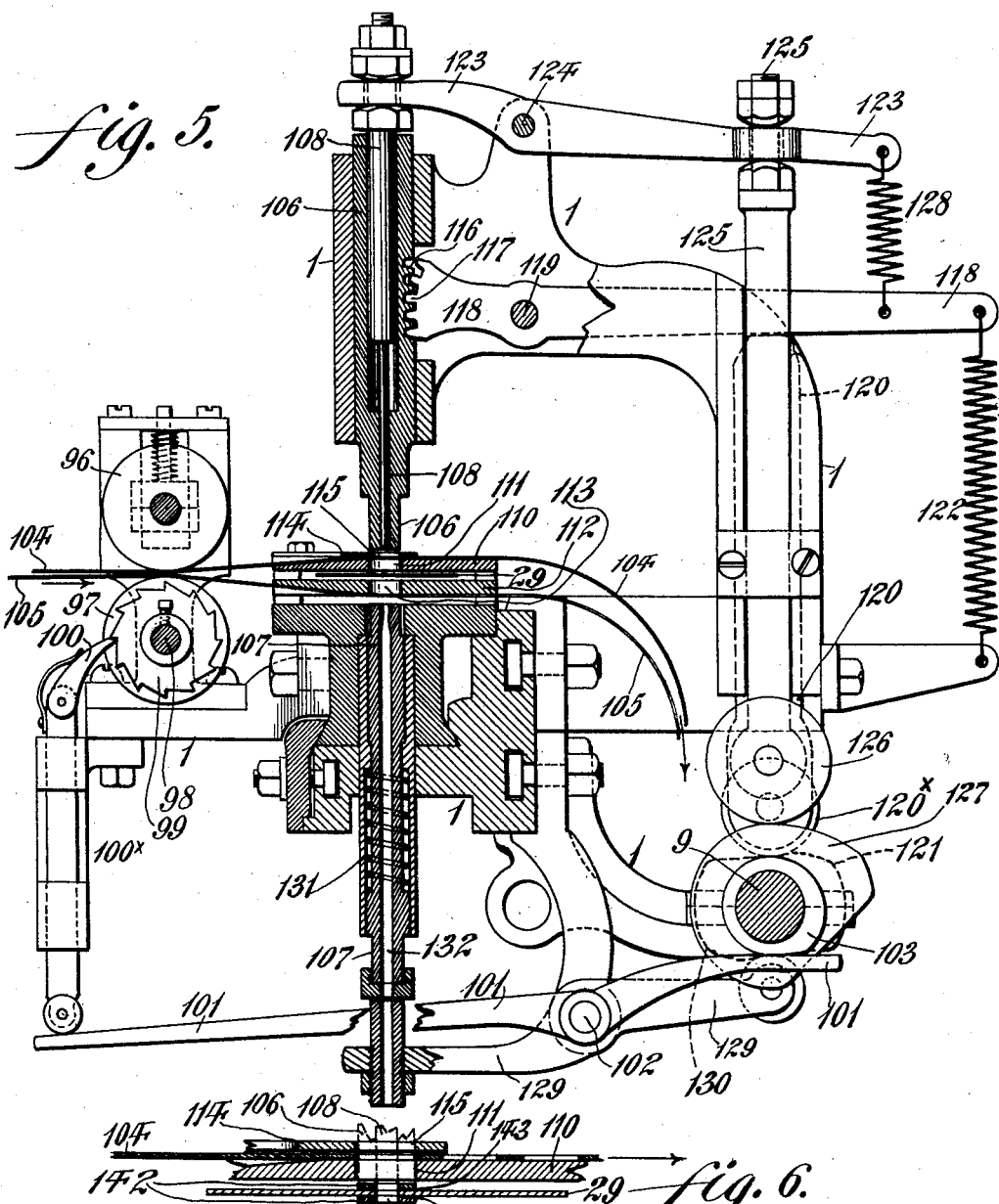

No. 771,747. PATENTED OCT. 4, 1904.
I. ROBBINS.
MACHINE FOR MAKING TAGS.
APPLICATION FILED FEB. 2, 1903.
NO MODEL. 8 SHEETS—SHEET 6.
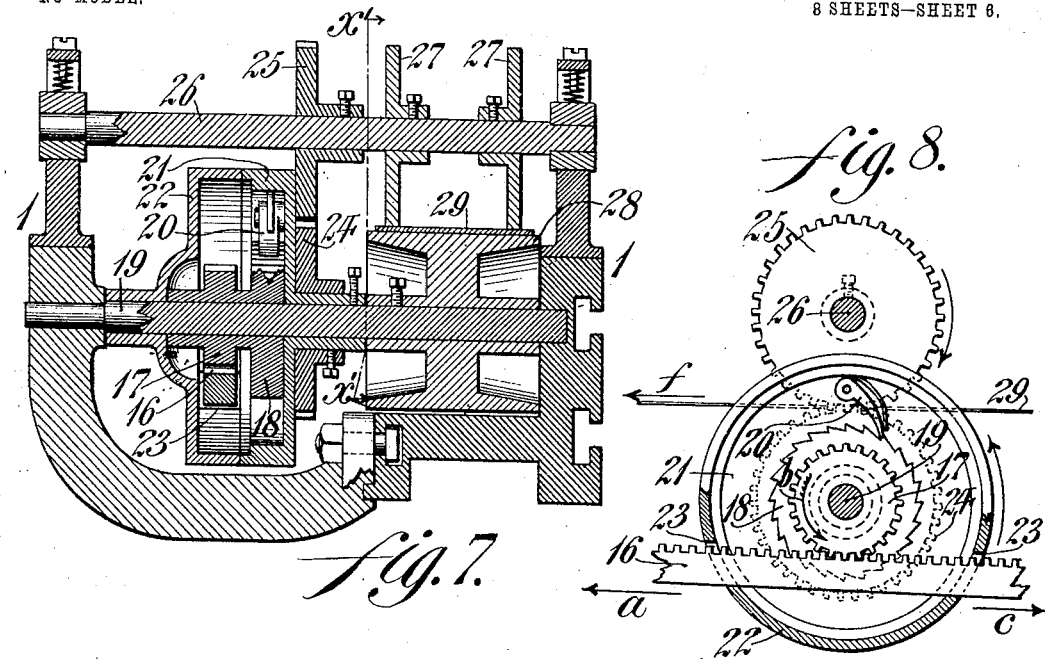
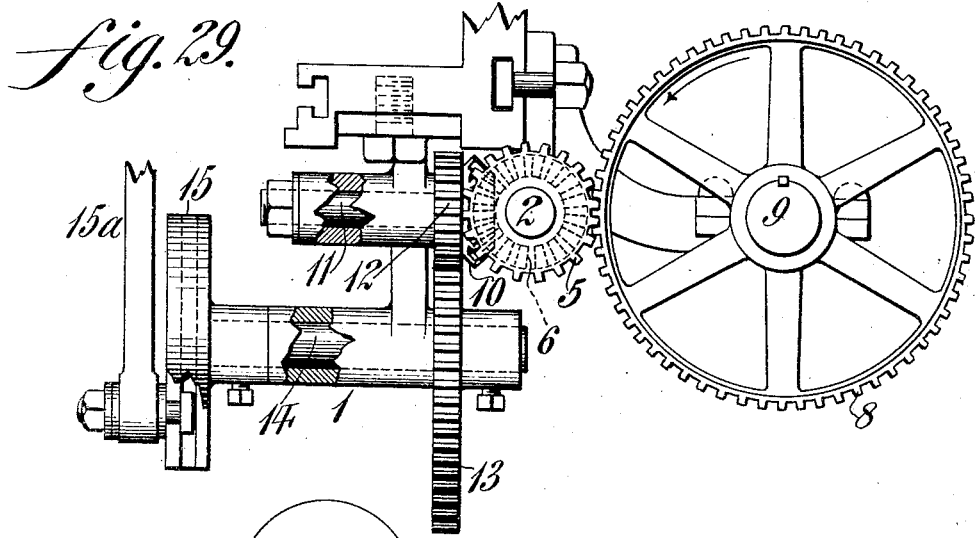
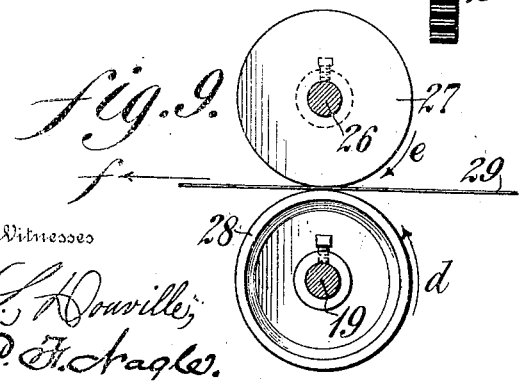

No. 771,747.  
PATENTED OCT. 4, 1904.  
I. ROBBINS.  
MACHINE FOR MAKING TAGS.  
APPLICATION FILED FEB. 2, 1903.  
NO MODEL.  
8 SHEETS—SHEET 7.
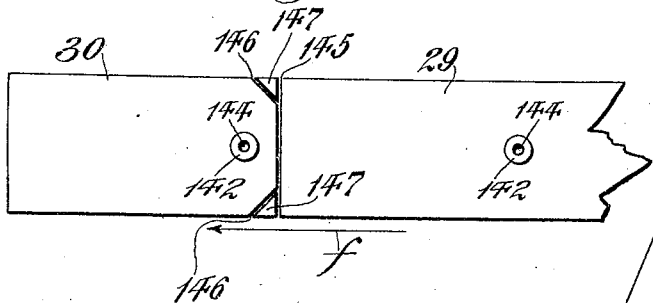
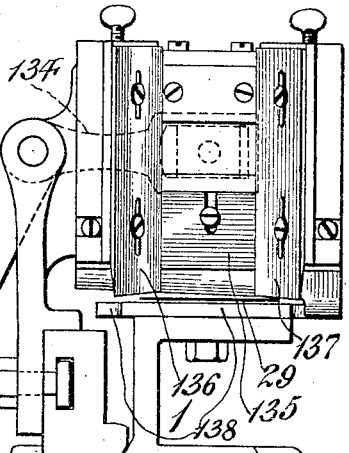
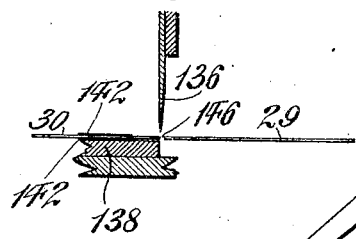
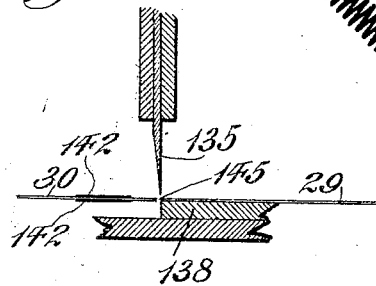
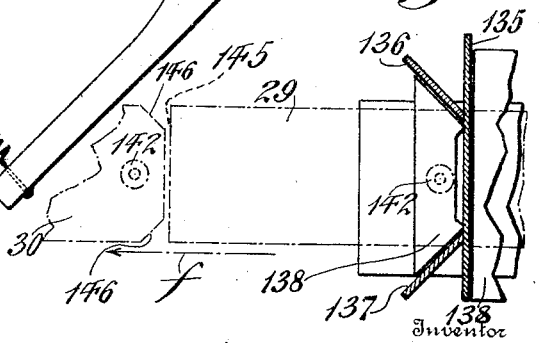
Witnesses  
By  
Ira Robbins.  
Attorneys No. 771,747. PATENTED OCT. 4, 1904.
I. ROBBINS.
MACHINE FOR MAKING TAGS.
APPLICATION FILED FEB. 2, 1903.
NO MODEL. 8 SHEETS—SHEET 8.

Witnesses
L. Douville
O. F. Eagle

Inventor
Ira Robbins.
By Wiedersheim + Fairbanks
Attorneys

No. 771,747. Patented October 4, 1904.

UNITED STATES PATENT OFFICE.

IRA ROBBINS, OF PHILADELPHIA, PENNSYLVANIA.

MACHINE FOR MAKING TAGS.

SPECIFICATION forming part of Letters Patent No. 771,747, dated October 4, 1904.

Application filed February 2, 1903. Serial No. 141,403. (No model.)

*To all whom it may concern:*

Be it known that I, IRA ROBBINS, a citizen of the United States, residing in the city and county of Philadelphia, State of Pennsylvania, have invented new and useful Improvements in Machines for Making Tags, of which the following is a specification.

My invention relates to improvements in a machine for making tags; and it consists of means for applying adhesive material at intervals to the upper and the under sides of the blank or strip of paper from which tags are made, so as to cause the buttons or reinforcing-rings which surround the perforation of the tags to adhere to the latter.

It also consists of means for punching the buttons from a blank and pressing the same where the adhesive material is deposited by the applying device, and thus cause the same to adhere in position.

It also consists of means for feeding the strips of paper from which the tags and the buttons are made, all of which is hereinafter described and finally pointed out in the claims.

Figure 1:
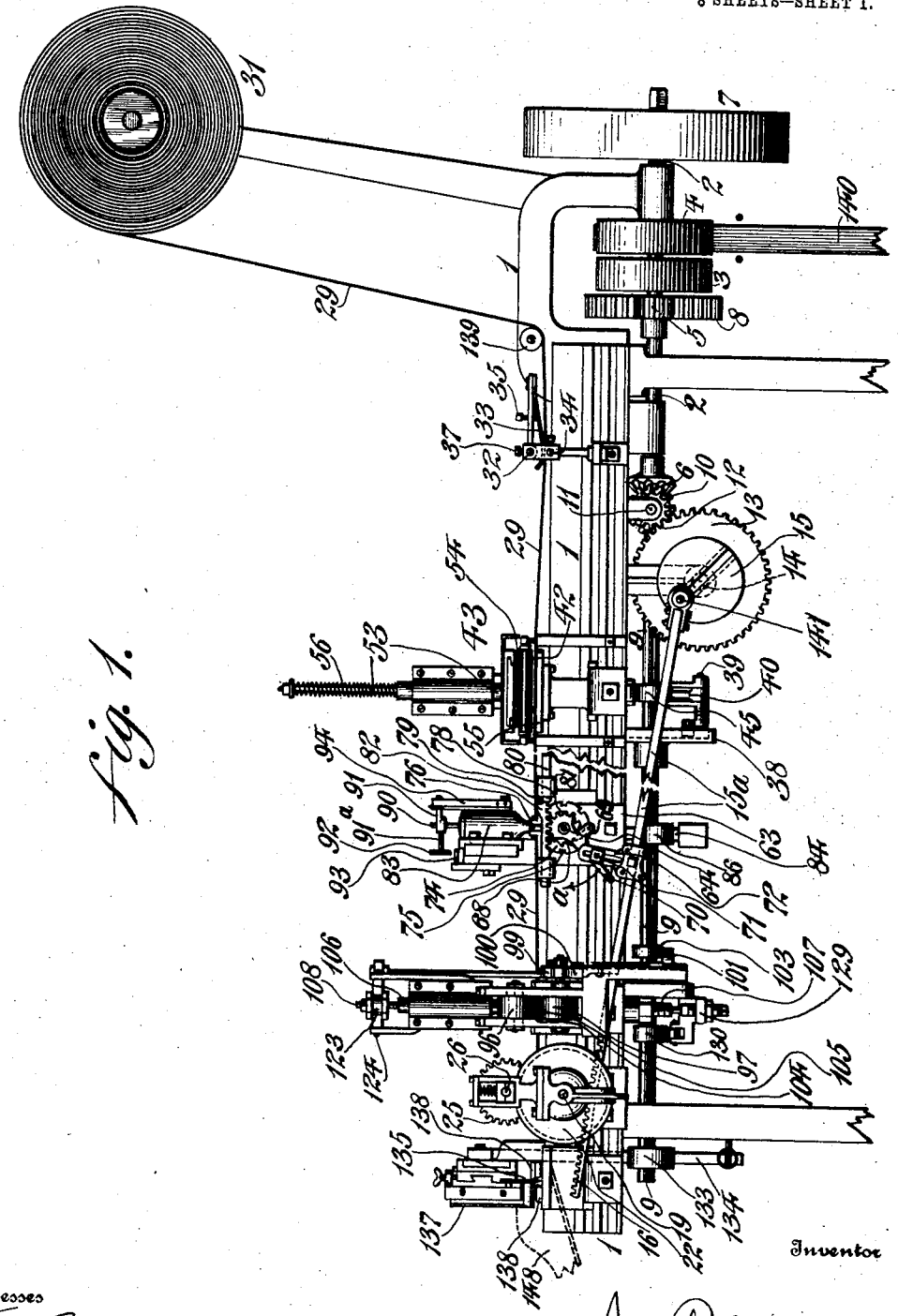
Figure 15:
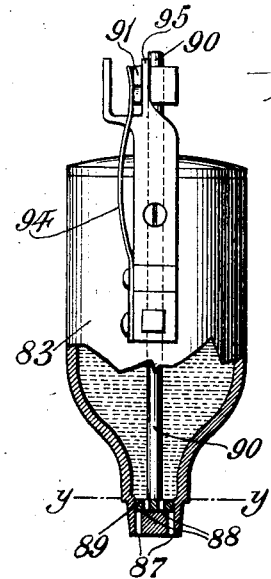
Figure 20:
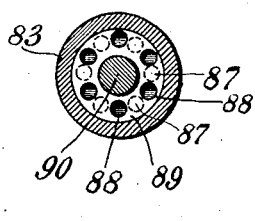
Figure 21:
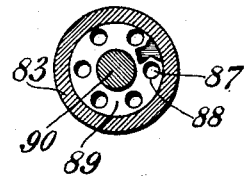
Figure 16:
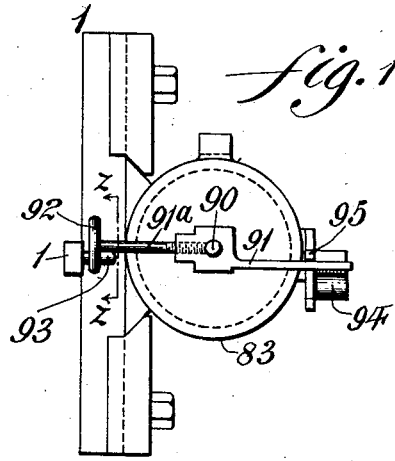
Figure 17:
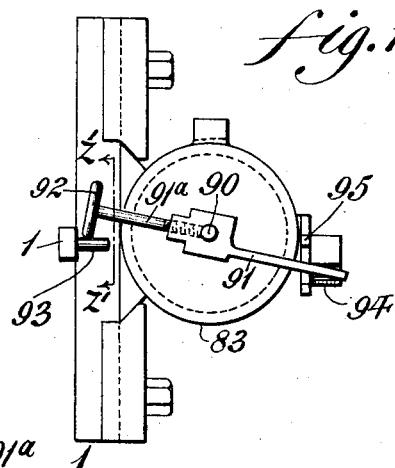
Figure 18:
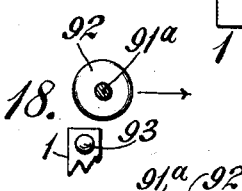
Figure 19:

Figure 1 represents a side elevation of the machine. Fig. 2 represents a plan view of the machine. Fig. 2½ represents a perspective view of certain detached portions of the device. Fig. 3 represents a partial elevation and partial vertical section of certain portions of the machine, the section being taken on line $u\ u$, Fig. 2, on an enlarged scale. Fig. 4 represents a partial elevation and partial vertical section of certain portions of the machine, the section being taken on line $v\ v$, Fig. 2. Fig. 5 represents a partial elevation and partial vertical section of certain portions of the machine, the section being taken on line $w\ w$, Fig. 2. Fig. 6 represents a vertical section of certain of the parts seen in Fig. 5, slightly enlarged. Fig. 7 represents a vertical section of a portion on line $x\ x$, Fig. 2, on an enlarged scale. Fig. 8 represents a partial end elevation and partial vertical section of certain of the parts seen in Fig. 7. Fig. 9 represents a partial end elevation and partial vertical section of certain of the parts seen in Fig. 7, the section being taken on line $x'\ x'$, Fig. 7. Fig. 10 represents an end elevation of the cutting device. Fig. 11 represents a partial plan view and partial horizontal section of certain of the parts seen in Fig. 10. Figs. 12 and 13 represent vertical sections of certain portions of the cutting device on an enlarged scale. Fig. 14 represents a plan view of the product of the machine. Fig. 15 represents a partial front elevation and partial vertical section of a cup and its adjuncts employed. Fig. 16 represents a plan view of certain detached portions of the machine. Fig. 17 represents a plan view of the parts seen in Fig. 16, certain of which are in different positions from the corresponding parts seen in Fig. 16. Fig. 18 represents a vertical section on line $z\ z$ in Fig. 16. Fig. 19 represents a vertical section on line $z'\ z'$, Fig. 17. Fig. 20 represents a horizontal section on line $y\ y$, Fig. 15, on an enlarged scale. Fig. 21 represents a view of the parts seen in Fig. 20, certain of which are in different positions from the corresponding parts seen in Fig. 20. Fig. 22 represents a side elevation of the cup and its adjuncts seen in Fig. 15. Fig. 23 represents a plan view of certain detached portions of the device. Fig. 24 represents a plan view of the cup seen in Fig. 22. Fig. 25 represents a vertical section of certain detached portions of the device. Fig. 26 represents a side elevation of certain of the parts seen in Fig. 25. Figs. 27 and 28 are perspective views of the upper and lower sides, respectively, of a strip from which tags are cut and illustrate the adhesive material as applied by this machine to said strip. Fig. 29 represents an elevation, partially in section, of a portion of the right-hand end of Figs. 1 and 2 on an enlarged scale.

Similar numerals of reference indicate corresponding parts in the figures.

Referring to the drawings, 1 designates the frame of the machine, in which is journaled the driving-shaft 2, provided with the fixed and loose pulleys 3 and 4, respectively, a pinion 5, a bevel gear-wheel 6, and a balance-wheel 7, as best seen in Fig. 1, it being noted that the pinion 5 meshes with a gear-wheel 8, secured to a counter-shaft 9, mounted on the frame 1, so as to transmit motion thereto, and consequently to the cams carried thereby.

The bevel gear-wheel 6 meshes with a bevel gear-wheel 10, secured to a shaft 11, journaled in the frame 1 at a right angle to the shaft 2, it being noted that said shaft 11 carries a pinion 12, which meshes with a gear-wheel 13, secured to a shaft 14, journaled in the frame 1, so as to impart motion to said shaft 14, and consequently to a crank-wheel 15 mounted thereon, said wheel 15 having connected with a wrist-pin thereon the rod 15ª, which is provided with a rack 16, (see Figs. 1, 2, 7, and 8,) which rack engages with a pinion 17, which may either be secured to a ratchet-wheel 18 or formed integral therewith. (See Fig. 7.) The pinion 17 and ratchet-wheel 18 are loosely mounted on a shaft 19, journaled in the frame 1, and it is to be noted that said ratchet-wheel 18 is engaged by a pawl or dog 20, which is pivoted to a wheel 21, secured to the shaft 19, the object of all of which being hereinafter described.

The free end of the rod 15ª—that is to say, the rack portion thereof—is guided and supported in a flanged plate 22, it being noticed that the flange of said plate is provided with openings 23, through which is passed the rack 16, thus permitting the latter to move to and fro when motion is imparted thereto by the crank-wheel 15. (See more particularly Fig. 8.)

The wheel 21 has secured to it a gear-wheel 24, which meshes with a gear-wheel 25, secured to a shaft 26, journaled on the frame 1, said shaft 26 having secured thereon the feed-rolls 27, which operate in conjunction with the feed-roller 28, which is secured to the shaft 19 below said rolls 27, it being understood that the object of the feed-rolls 27 and 28 is to draw the blank or strip of paper 29, from which the tags 30 are made, through the machine, said blank or strip being supplied in the present instance from a roll 31, as seen in Fig. 1.

Secured to the frame 1 is a horizontally-extending rod 32, which is provided with a spring-finger 33, (see Figs. 1 and 2,) which bears upon and serves as a tension device for the strip 29 and causes the latter to remain taut between said spring 33 and the feed-rollers 27 and 28, it being noted that the spring 33 bears upon the strip and forces the latter against a rod or bed 34, placed beneath said strip, thereby producing the tension, which latter may be adjusted by the screw 35.

The rods 32 and 34 are provided with blocks 36, which may be moved toward or from each other by sliding the same upon the rod 32 and serve as guides between which the strip 29 passes on its way from the reel 31 to the feed-rollers 27 and 28. The blocks 36 are retained in position on the rod 32 by screws 37, it being apparent that the distance between blocks 36 may be adjusted to conform to the width of the strip 29.

The shaft 9 is provided with a cam 38, (see Figs. 1, 2, and 3,) which by means of the crank-arm 38ª imparts motion to the rock-shaft 39, and consequently by the arm 38 to the toothed segment 40, which engages with a rack 41, which carries the inking-rollers 42, forming part of a printing device 43, the ink being supplied by the inking-plate 44, to which a rotary motion may be imparted in any well-known manner. The shaft 9 also carries a cam 45, which (see Fig. 3) imparts a reciprocating motion to a rod 46, which latter when moving upward elevates the limb 47 of a lever 48, which is fulcrumed at 49 on the frame 1, and consequently depresses the limb 50 of said lever, said limb 50 having a toothed head 51, which engages the teeth 52 of the plunger 53, the latter carrying the chase 54, so that the form on said chase may print the strip 29, which, as evident in Fig. 3, passes between said form and the platen 55 beneath the same. The plunger 53 and its adjuncts are returned to their normal positions by a spring 56.

57 represents an ink-well, which contains a roller 58, which may be rotated in any well-known manner and which applies ink to the roller 59, which when lowered supplies ink to the plate 44, the ink being fed to the rollers 42, and consequently to the type or form, as is evident, it being understood that when the rod 46 is in its elevated position a stud 60 on said rod is also elevated, whereupon the arms 61, which carry the ink-applying roller 59, are permitted to turn upon their pivot 62, so as to cause the roller 59 to leave the roller 58 and come in contact with the plate 44, and thus apply ink thereto for the purpose of supplying the plate 44, as hereinbefore explained.

Supported in the frame 1 (see Figs. 1, 2, 4, and 23) is a trough 63 for containing adhesive material, on which trough is journaled a shaft 64, to which is secured the hub 65, from which project radially the tubular cups 66, provided with openings 67, which permit surplus adhesive material in said cups to escape therefrom and return into the trough 63, as hereinafter described. The shaft 64 has secured thereon a ratchet-wheel 68, with which engages a dog 69, carried by the arm 70, loosely mounted on the shaft 64, it being noted that said arm is turned in the direction indicated by the arrow $a$ in Fig. 1 by the stud 71, which projects from a bracket 72, secured to the rod 15ª. The return motion of the arm 70 is effected by a spring 73, as will be hereinafter described.

On the shaft 64 is the head or wheel 74, whose periphery is provided with notches 75, adapted to receive a latch 76, pivoted to some fixed point, as at 77, (see Fig. 23,) for a purpose hereinafter described. The upper portion of the arm 70 has a toothed segment 78, (see also Fig. 2½,) which engages with teeth 79 of a rack-bar 80, so as to move the latter to and fro, it being fitted in guides 81, supported on the well 63, it being noted that said rack-bar 80 is provided with a raised shoulder 82, (see more particularly Figs. 1 and 2½,) which at certain times is brought under the latch 76 and lifts the latter, so as to remove the same from the notches 75 in the wheel 74 for a purpose hereinafter described.

83 is a cup or trough for adhesive material, the same being above the trough 63, (see Figs. 1, 2, 4, 15, 22, 24, and 25,) said cup being mounted in suitable guides in the frame 1, as seen in Fig. 4, and having a vertical reciprocating motion imparted thereto by a lever 84, which is fulcrumed at 85 on the frame and operated by a cam 86, secured to the shaft 9. In Fig. 4 I have shown the cup 83 as movable within the guides 83× on the frame 1 of the machine; but any other equivalent form of guide may be employed. The bottom of the cup 83 is provided with perforations 87, with which register at certain times the perforations 88 in a valve 89, formed with or secured to a stem 90, (see also Figs. 15, 16, and 17,) it being noted that the upper portion of said stem 90 has secured thereto by a screw 91$^a$ an arm 91, provided with a head 92, which is adapted at certain times to be brought in contact with a pin 93, rigidly secured in the frame 1 of the machine. The cup 83 is provided with a spring 94, which bears against the arm 91, so as to normally retain the same in the position seen in Fig. 16, it being noted that a stop 95 prevents said spring 94 from turning the arm 91 beyond the desired point, as best seen in Fig. 15, the object of all of which will be hereinafter described.

Journaled on the frame 1 are feed-rollers 96 and 97, (see Fig. 5,) it being noted that the roller 97 is secured to a shaft 98, which carries a ratchet-wheel 99, the ratchet being engaged by a dog or pawl 100, which is carried by the slide 100× and operated by a lever 101, fulcrumed at 102 on the frame 1 and engaged by a cam 103, secured to the shaft 9, so as to impart motion to the roller 97. Between said rollers 97 and 96 is passed the two strips 104 and 105 of paper, said strips being adapted to be subjected to the punches 106, 107, and 108, said strips 104 and 105 being delivered in the present case from a single reel 109, as seen in Fig. 2, it being noted that the strip 104 is passed above the strip 29 and the strip 105 below the same for a purpose hereinafter described. The strip 104 is supported and guided on the plate 110, which is provided with an opening 111, through which the punch 106 is at certain times advanced, so as to punch a wad from the strip 104 for a purpose hereinafter explained. The strip 105 is guided in a plate 112, which is provided with an opening 113, through which the punch 107 is at certain times advanced, so as to punch a wad from the strip 105 for a purpose hereinafter explained. Secured to the plate 110 is the stripper 114, the same being provided with an opening 115 to permit the punch 106 to pass therethrough when punching a wad from the strip 104.

The punch 106 is provided with a rack 116, with which engages the toothed segment 117 on a lever 118, fulcrumed at 119 on the frame 1, it being noted that said lever 118 is operated by a sliding bar 120, on which said lever rests, said bar being guided in the frame 1 and receiving an upward movement by the cam 121, secured to the shaft 9, said cam engaging the roller 120× on said bar 120. The downward movement of said bar is assisted or effected by a spring 122, which is connected with the lever 118 and a fixed point on the frame and exerts a downward pressure both upon said lever and the bar 120.

A vertical reciprocating motion is imparted to the punch 108, which is inclosed by the punch 106, by a lever 123, fulcrumed at 124 on the frame 1, it being noted that said lever 123 is operated by a bar 125, provided with a roller 126, which contacts with a cam 127, secured to the shaft 9, and which imparts an upward movement to said bar 125. The downward movement of the bar 125 is assisted or effected by a spring 128, which is connected with said lever 123 and the lever 118. (See Fig. 5.)

The punch 107 has an upward movement imparted thereto by a lever 129, fulcrumed at 102 and to which motion is imparted by a cam 130, secured to the shaft 9. The downward movement of said punch 107 is assisted or effected by a spring 131, which encircles said punch and has its ends seated on shoulders respectively on said punch and the guide therefor. In said punch 107 is a bore 132, for a purpose hereinafter described.

The shaft 9 has secured thereon a cam 133, (see Figs. 1, 2, and 10,) which operates an elbow-lever 134, to whose upper limb are secured the three-sided knife formed of blades 135, 136, and 137, which cut a tag 30 from the strip 29, (see also Fig. 14,) it being noted that said knives operate in connection with the bed-plate 138.

The operation is as follows: The strip 29 is drawn from the reel 31 and passed under the roller 139 and from the latter through the tension device—that is to say, between the spring 33 and the rod 34—and then through the printing device 43 and from the latter between the discharge portion of the cup 83 and the top portion of a finger 66, as best seen in Fig. 4. The strip 29 is then brought between the punches 106 and 107, next between the feed-rollers 27 and 28, as best seen in Fig. 7, and then under the knives 135, 136, and 137 and over the bed-plates 138, as best seen in Fig. 10. The strips 104 and 105 are then drawn from the reel 109 and are passed between the feed-rollers 96 and 97, the strip 104 being passed over the strip 29 and under the punches 106 and 108. The strip 105 is passed under the strip 29 and over the punch 107, as best seen in Fig. 5, after which the belt 140 is shifted from the loose pulley 4 to the fixed one, 3, so as to impart motion to the shaft 2, it being noted that the pinion 5 on the shaft 2 transmits motion to the gear-wheel 8, and consequently to the shaft 9. The bevel-gear 6 on the shaft 2 imparts motion to the bevel-gear 10, and consequently to the shaft 11 and pinion 12 thereon, and the latter imparts motion to the gear-wheel 13, and consequently to the head 15, which latter imparts a reciprocating motion to the rod $15^a$ and rack 16 thereon, it being understood that the wrist-pin 141 may be set nearer to or farther from the center of the head 15 in order to adjust the degree of movement of the rod $15^a$.

Referring now to Figs. 7, 8, and 9, it will be noted that when the rack 16 is moving in the direction indicated by the arrow $a$ in Fig. 8 it imparts motion to the pinion 17 and causes the same to rotate in a direction opposite to that indicated by the arrow $b$, thus rotating the ratchet-wheel 18 in a similar direction, and since said pinion and ratchet-wheel in the present instance are integral and are loosely mounted on the shaft 19 the teeth of the ratchet-wheel 18 are caused to slip under the dog 20, thereby imparting no motion to the shaft 19. When, however, the rack 16 is moving in the direction indicated by the arrow $c$ in Fig. 8, it imparts motion to the pinion 17 and causes the same to rotate in the direction indicated by the arrow $b$, whereupon a tooth in the ratchet-wheel 18 carries the dog 20 with it and transmits motion to the wheel 21, and consequently to the shaft 19, to which it is secured. The rotation of the shaft 19 imparts motion to the feed-roller 28 and causes the same to rotate in the direction indicated by the arrow $d$ in Fig. 9, while the feed-rollers 27 are caused to rotate in the direction indicated by the arrow $e$ in Fig. 9 by reason of the gear-wheels 24 and 25. The rotary motion imparted to the feed-rollers 27 and 28 is intermittent, and a dwell or rest is so timed that the printing of the strip, the application of adhesive material thereto, the punching, and the cutting are all accomplished during this dwell. When the feed-rollers 27 and 28 are at rest, the segment 40 imparts a reciprocating motion to the rack 41 and causes the inking-rollers 42 to apply ink to the form in the chase 54, and when said rollers are out of the path of the same said chase is lowered by the lever 50, the rod 46, and cam 45, as will be apparent on an inspection of Fig. 3. When the chase 54 is in its lowermost position, the form therein prints the desired matter upon a portion of the strip 29. After the printing has been accomplished the feed-rollers 27 and 28 are again rotated, as hereinbefore described, and feed the strip 29 in the direction indicated by the arrows $f$ in Figs. 8, 9, 11, and 14 the required distance to bring the proper portion of the strip 29 to the fingers 66 and the cup 83, so as to have adhesive material applied to said strip 29 in the following manner: The fingers 66 in dipping into the adhesive material in the well 63 become coated therewith, and as said fingers are hollow the adhesive material within said fingers and which is carried up thereby when the fingers 66 are moving into a vertical position after passing through the adhesive material the surplus thereof is discharged into the well 63 through the openings 67, it being noted on referring to Fig. 23 that the fingers 66 are in the form of hollow cylinders and that the blunt edges of the fingers 66, which come in contact with the strip 29, apply the adhesive material to the under side of said strip 29 at intervals and in the form of rings 141, as seen in Figs. 26 and 28, and which cause the subsequently-made buttons 142 on the under side of the strip 29 to adhere thereto, as seen in Fig. 6. When the fingers 66 are in the positions seen in Fig. 23, the latch 76 is in engagement with one of the notches 75, thus causing said fingers 66 to remain in the positions seen in said Fig. 23. When the shaft 64 is to be rotated, so as to bring a subsequent finger 66 under the strip 29, the raised portion 82 on the rod 80 is brought under the latch 76 by the sliding movement imparted to said rod by the teeth 78, and thus causes said latch to move out of a notch 75, thereby permitting the shaft 64 to be rotated by the dog 69, the lever 70, and stud 71, as best seen in Fig. 4. The rod 80 is returned to its normal position, as seen in Fig. 4, by the expansion of the spring 73 after the stud 71 is removed from contact with the lever 70.

The adhesive material as applied at intervals to the upper side of the strip 29 is in the form of dotted rings 143, as seen in Fig. 27, and is accomplished in the following manner: The cup 83 is lowered by the lever 84 and cam 86, whereupon the head 92 of the screw $91^a$ is brought in contact with the pin 93, (see Figs. 15 to 21, both inclusive,) which causes the screw $91^a$, and consequently the lever 91, to be deflected from the positions seen in Figs. 16 and 18 to the ones seen in Figs. 17 and 19, whereupon the stem 90 and valve 89 are slightly turned and the ports 88 in said valve are moved from the positions seen in Fig. 20 to those seen in Fig. 21, so as to cause the ports 87 and 88 to register, and thus permit some of the adhesive material in the cup 83 to escape therefrom and be applied to the strip 29, so that the subsequently-made buttons 142 on the upper side of said strip may adhere thereto when brought in contact with the rings 143 by the punch 106. When the cup 83 is elevated by the lever 84, the head 92 is removed from contact with the pin 93, whereupon the lever 91, the screw $91^a$, the stem 90, and valve 89 will be moved from the positions seen in Figs. 17 and 21 to those seen in Figs. 16 and 20 by the spring 94, and thus close the ports 87 in the cup 83, and thereby prevent further escape of the adhesive material contained in said cup. After the adhesive material is applied to the strip 29 the feed-rollers 27 and 28 are again rotated, and thus move the strip 29 a distance sufficient to exactly bring a set of rings 141 and 143 between the punches 106 and 107, so that when said punches are moved toward each other by the mechanism hereinbefore described they punch the buttons 142 from the strips 104 and 105 and press the same against the strip 29, as seen in Fig. 6, the punches being shown in dotted lines, it being understood that said buttons are brought in contact with the adhesive material deposited on said strip 29 and that the pressure of the punches causes the buttons 142 to firmly adhere to the strip 29. At the proper moment the punch 108 is lowered, as hereinbefore described, and punches an opening 144 through the center of the buttons 142 and also through the strip 29, as seen in Figs. 6 and 14, it being understood that the wads cut from strip 29 and buttons 142 drop through the bore 132 in the punch 107 and escape therethrough from the machine.

After the punching operation has been accomplished motion is again imparted to the feed-rollers 27 and 28, whereupon the strip 29 is again fed or moved toward the cutters 135, 136, and 137, and when the buttons 142 have reached a point slightly beyond the knife 135 (see Fig. 2) the feeding operation ceases, and the knives 135, 136, and 137 are lowered by the lever 134 and cam 133, thereby causing the knife 135 to cut the strip 29 transversely, as at 145 in Figs. 13 and 14, while the flaring knives 136 and 137 cut the strip 29, as at 146, thereby removing the corners 147, after which the finished tag 30 is directed by a chute 148 to any desired point of discharge or collection.

Having thus described my invention, what I claim as new, and desire to secure by Letters Patent, is—

1. In a machine for making tags, feeding mechanism for the blank, consisting of a rod, means for imparting motion in opposite directions, a rack on said rod, a pinion on the frame of the machine with which said rack engages, a ratchet-wheel, a shaft on which said pinion and wheel are loosely mounted, a wheel secured to said shaft, a pawl on said wheel engaging said ratchet, feed-rollers and gearing intermediate of said feed-rollers and said pawl-carrying wheel.

2. In a machine for making tags, feeding mechanism for the blanks consisting of a rod, means for imparting motion in opposite directions to said rod, a rack on said rod, a pinion on the machine-frame, with which said rack engages, a ratchet-wheel, a shaft on which said pinion and wheel are loosely mounted, a wheel secured to said shaft, a pawl on said wheel engaging said ratchet, feed-rollers and gearing intermediate of said feed-rollers and said pawl-carrying wheel, and a flanged plate supporting said rod and having openings for the passage of said rack.

3. In a machine for making tags, a tension device for the blank comprising a spring-finger mounted to bear directly on the blank, rods between which the free end of said finger is disposed and against one of which the blank is pressed by said spring-finger, a support for said finger and rods, laterally-adjustable blocks fitted on said support, set-screws for said blocks, and an adjusting-screw for said finger adjustably mounted in a bearing independent of the finger and bearing against the latter intermediate its ends.

4. In a machine for making tags, means for applying adhesive material to the blank, consisting of a trough, a cup mounted in said trough, a rotary shaft carrying said cup and means for imparting intermittent motion to said cup, consisting of a ratchet, a dog or pawl engaging said ratchet, an arm carrying said pawl, a stud engaging said arm, a rod carrying said stud, means for operating said rod in opposite directions, whereby said arm is operated in one direction, and a spring for causing the return motion of said arm.

5. In a machine for making tags, a trough for adhesive material, a cup adapted to dip thereinto, a rotary shaft carrying said cup, means for imparting intermittent motion to said cup, a notched wheel on said shaft, a latch on the frame of the machine adapted to engage with either of said notches, an arm loosely mounted on said shaft, a toothed segment on said arm, a rack-bar engaging said segment, a shoulder on said rack-bar adapted to lift said latch.

6. In a machine for making tags, a device for applying adhesive material to the blank, consisting of a trough, a cup therein, a shaft carrying said cup, and a device for supporting said shaft, means for imparting intermittent motion to said cup, said cup being of tubular form and having a discharge-opening leading back to said trough.

7. In a machine for making tags, a cup for applying adhesive material, means for raising and lowering said cup, a valve in said cup having perforations extending therethrough, said cup having a plurality of perforations in its bottom to register at predetermined periods with those of the valve, and means for rotating said valve.

8. In a machine for making tags, a cup for adhesive material, a valve in said cup, a stem for said valve, means for raising and lowering said cup, a screw connected with the stem of said valve, an arm connected with said stem, a head on said arm, a pin on the frame of the machine, and a spring bearing against said arm, said valve and cup being provided with perforations arranged to register at predetermined times as the valve is rotated.

9. In a machine for making tags, feed-rollers, a pair of tables or plates with openings therein, punches, one above the upper table and one below the lower table, means for actuating said punches, a punch within the upper punch for movement independent thereof, blank-feeding means, and an adhesive-applying device intermittently actuated and embodying a vertically-movable cup with perforations and a rotatable valve with perforations to register at predetermined times with those of the cup, and means for pressing the buttons on the blank at points of application of the adhesive material.

10. In a machine for making tags, a pair of tables or plates with openings, feed-rollers, means for forming buttons on opposite sides of and from a plurality of strips, piercing means movable with and independent of the said button-forming means, blank-feeding means, means for applying an adhesive material to the blank and embodying a vertically-movable cup with perforations and a rotatable valve having perforations to register at predetermined times with those of the cup, means for pressing the buttons on the same and means for intermittently actuating the adhesive-applying means.

11. In a machine for making tags, means for forming buttons from and on opposite sides of a plurality of strips, piercing means movable independent of said means, blank-feeding devices, means for applying adhesive material to the blank, and embodying a vertically-movable cup with perforations and a rotatable valve having perforations to register at predetermined times with those of the cup, means for pressing the buttons on the same, means for intermittently actuating the adhesive-applying means, and means for severing the blank when the tag is finished.

12. In a machine for making tags, feed-rollers, means for forming buttons from and on opposite sides of a plurality of strips or pieces of material, separate supports for said strips, means for feeding the strips, means for passing a blank between said supports, means for applying adhesive material to said blank and embodying a vertically-movable cup with perforations and a rotatable valve having perforations to register at predetermined times with those of the cup, means for intermittently actuating said adhesive-applying means, means for pressing buttons on said blank at the place of application of the adhesive material, means for piercing the blank through the buttons, and means for feeding the blank to the different instrumentalities employed.

13. In a machine for making tags, feed-rollers, means for forming buttons from and on opposite sides of a plurality of strips or pieces of material, separate supports for said strips, means for feeding the strips, means for passing a blank between said supports, means for applying adhesive material to said blank, and embodying a vertically-movable cup with perforations and a rotatable valve with perforations to register at predetermined times with those of the cup, means for intermittently actuating said adhesive-applying means, means for pressing buttons on said blank at the place of application of the adhesive material, means for piercing the blank through the buttons, means for feeding the blank to the different instrumentalities, and means for stopping the feed and actuating a cutter to sever the blank when the tag is finished.

14. In a machine for making tags, means for forming buttons from and on opposite sides of a plurality of strips or pieces of material, strip-feeding devices, means for feeding a blank, means for applying adhesive material to the blank, and embodying a vertically-movable cup with perforations and a rotatable valve having perforations to register at predetermined times with those of the cup, means for intermittently actuating the adhesive-applying means, means for pressing the formed buttons on the blank at the places of application of the adhesive material, means for piercing the button and blank after the formed buttons have been pressed on the blank, said means being carried by a portion of the button-forming means, and means for severing the blank when the tag is finished.

15. A machine for making tags having means for applying adhesive material to the blank at intervals, and comprising an intermittently-actuated receptacle and a trough into which it is adapted to be dipped, means for forming buttons applicable to opposite sides of said blank, means for pressing said buttons on said blank at the places of adhesive material, and means for punching through said buttons and blank.

16. A machine for making tags having means for applying adhesive material to the blank at intervals and comprising an intermittently-actuated receptacle and a trough into which it is adapted to be dipped, means for forming buttons applicable to opposite sides of said blank, means for pressing buttons on said blank at the places of adhesive material, means for punching through said buttons and blank, and means for severing the blank when the tag is finished.

IRA ROBBINS.

Witnesses:
JOHN A. WIEDERSHEIM,
S. R. CARR.